(12) United States Patent  
Weigand et al.

(10) Patent No.: US 7,197,071 B1  
(45) Date of Patent: Mar. 27, 2007

(54) FILM RESOURCE MANAGER

(75) Inventors: Gilbert G Weigand, Ashburn, VA (US); Paul R. Klamer, La Canada, CA (US); Christopher J. Cookson, Studio City, CA (US)

(73) Assignees: Warner Bros. Entertainment Inc., Burbank, CA (US); Time Warner, Inc., New York, NY (US); AOL LLC, Dulles, VA (US)

( * ) Notice: Subject to any disclaimer, the term of this patent is extended or adjusted under 35 U.S.C. 154(b) by 627 days.

(21) Appl. No.: 10/334,130

(22) Filed: Dec. 31, 2002

Related U.S. Application Data

(63) Continuation-in-part of application No. 10/284,461, filed on Oct. 31, 2002, and a continuation-in-part of application No. 10/330,545, filed on Dec. 30, 2002.

(60) Provisional application No. 60/408,881, filed on Sep. 9, 2002.

(51) Int. Cl.  
*H04B 1/66* (2006.01)

(52) U.S. Cl. .............................. 375/240.01

(58) Field of Classification Search ......... 375/240.01; 358/487, 1.13; 348/722; 705/27; 382/167; 355/40; H04B 1/66  
See application file for complete search history.

(56) References Cited

U.S. PATENT DOCUMENTS

| | | | |
|---|---|---|---|
| 4,872,160 A | 10/1989 | Hemmady et al. | |
| 5,014,125 A | 5/1991 | Pocock et al. | |
| 5,392,071 A | 2/1995 | Richards et al. | |
| 5,649,046 A | 7/1997 | Stewart et al. | |
| 5,666,215 A * | 9/1997 | Fredlund et al. | ............ 358/487 |
| 5,687,011 A | 11/1997 | Mowry | |
| 5,778,187 A | 7/1998 | Monteiro et al. | |
| 5,799,002 A | 8/1998 | Krishnan | |
| 5,859,951 A | 1/1999 | Aihara et al. | |
| 5,867,502 A | 2/1999 | Chang | |
| 5,935,245 A | 8/1999 | Sherer | |
| 5,946,614 A | 8/1999 | Robbins et al. | |
| 5,973,722 A | 10/1999 | Wakai et al. | |
| 5,983,005 A | 11/1999 | Monteiro et al. | |
| 6,011,782 A | 1/2000 | DeSimone et al. | |
| 6,075,887 A | 6/2000 | Brett | |
| 6,097,720 A | 8/2000 | Araujo et al. | |
| 6,119,163 A | 9/2000 | Monteiro et al. | |
| 6,141,336 A | 10/2000 | Bauchot et al. | |
| 6,151,632 A | 11/2000 | Chaddha et al. | |
| 6,157,435 A * | 12/2000 | Slater et al. | .................. 355/40 |
| 6,157,635 A | 12/2000 | Wang et al. | |
| 6,189,039 B1 | 2/2001 | Harvey et al. | |
| 6,195,680 B1 | 2/2001 | Goldszmidt et al. | |

(Continued)

OTHER PUBLICATIONS

Choi et al., Design of a Flexible Open Platform for High Performance Active Networks, 1999, St. Louis, Missouri.

(Continued)

*Primary Examiner*—Tung Vo  
(74) *Attorney, Agent, or Firm*—Fish & Richardson P.C.

(57) ABSTRACT

Post-production processing may be performed by receiving a film-processing order, determining a process useful in fulfilling film-processing order, identifying one or more resources available to perform the process useful in fulfilling the film-processing order, and scheduling with at least one of the identified resources to perform the process.

58 Claims, 5 Drawing Sheets

U.S. PATENT DOCUMENTS

| | | | |
|---|---|---|---|
| 6,198,477 | B1 | 3/2001 | Kurtze et al. |
| 6,259,701 | B1 | 7/2001 | Shur et al. |
| 6,269,217 | B1 | 7/2001 | Rodriguez |
| 6,363,075 | B1 | 3/2002 | Huang et al. |
| 6,363,429 | B1 | 3/2002 | Ketcham |
| 6,381,608 | B1 | 4/2002 | Savoie |
| 6,415,312 | B1 | 7/2002 | Boivie |
| 6,434,622 | B1 | 8/2002 | Monteiro et al. |
| 6,445,874 | B1 | 9/2002 | Catlow |
| 6,490,285 | B2 | 12/2002 | Lee et al. |
| 6,646,754 | B1 * | 11/2003 | Redd et al. ............. 358/1.13 |
| 6,674,923 | B1 * | 1/2004 | Shih et al. ............. 382/305 |
| 6,735,776 | B1 | 5/2004 | Legate |
| 6,771,323 | B1 * | 8/2004 | Dean et al. ............. 348/722 |
| 6,839,803 | B1 * | 1/2005 | Loh et al. ............. 711/113 |
| 6,956,967 | B2 * | 10/2005 | Gindele et al. ............. 382/167 |
| 2003/0033220 | A1 * | 2/2003 | Slater et al. ............. 705/27 |

OTHER PUBLICATIONS

Keller et al., An Active Router Architecture for Multicasr Video Distributions, St. Louis, Missouri.

Lockwood et al., Reprogrammable Network Packet Processing on the Field Programmable Port Extender (FPX), 2001, St. Louis, Missouri.

Taylor et al., Dynamic Hardware Pluggins (DHP): Exploiting Reconfigurable Hardware for High-Performace Programmable Routers, 2002, St. Louis, Missouri.

PCT International Search Report, Apr. 8, 2003, 6 pages.

Office Action for U.S. Appl. No. 10/284,461, May 6, 2005, 9 pages.

Office Action for U.S. Appl. No. 10/284,461, Jan. 19, 2006, 9 pages.

Office Action for U.S. Appl. No. 10/284,461, Jul. 12, 2006, 10 pages.

* cited by examiner

| Order ID | Resources Required | Scheduled Time |
|---|---|---|
| | Scanners C1-C10 | T1-T2 — 324 |
| | Processors P1-P50 | T3-T4 — 326 |
| | Processors P1-P50 | T4-T5 — 328 |

FILM RESOURCE MANAGER

CROSS-REFERENCE TO RELATED APPLICATIONS

This application claims priority to and is a continuation-in-part of U.S. patent application Ser. No. 10/284,461, filed Oct. 31, 2002, and titled "Post-Production Processing" and U.S. patent application Ser. No. 10/330,545, filed Dec. 30, 2002, and titled "Parallel Scanning and Processing System." This application also claims priority to U.S. Provisional Application No. 60/408,881, filed Sep. 9, 2002, and titled "Parallel Scanning, Processing and Realignment System." These applications are incorporated by reference.

TECHNICAL FIELD

This description relates to film-processing.

BACKGROUND

Various distinct film-processing resources are used to process motion picture films. For example, developed film may be scanned to generate digital images that are stored upon scanning or subsequently after the film images are processed (e.g., to eliminate defects appearing in the digital images). After processing, the digital images may be output to a film printer or digital media for viewing.

SUMMARY

Film-processing resources may be managed by receiving a film-processing order to process a film, and determining a process useful in fulfilling the film-processing order. One or more resources may be identified that are available to perform the process useful in fulfilling the film-processing order, and at least one of the identified resources is scheduled to perform the process.

Implementations may include one or more of the following features. For example, the process may include a film registration operation, scanning in a reel of film, and/or converting the film from a first resolution to a second resolution. The film-processing order may include a location identifier enabling access to the film. Priority for the process may be determined and used as a basis for the scheduling. The priority also may be used to identify a resource. The film-processing order may be scheduled to be performed before a previously-received film-processing order if the process useful in fulfilling the film-processing order of the film is determined to have a higher priority than the process useful in fulfilling the film-processing order of the previously-received film-processing order.

Receiving a film-processing order may include receiving an IP packet with the film-processing order encapsulated in an attribute portion of the IP packet. Determining a film-processing requirement may include determining a state of processing for the film, determining a film-processing operation to be performed on the film, and using the film-processing operation to generate the film-processing requirement. The film may include one or more film reels. Receiving a film may include receiving a film reel from a robotic array of two or more film reels to be accessed.

The film-processing order may include a date requirement indicating a time by which the film-processing order is required to be performed. The date requirement may be used to schedule the film-processing order.

The film-processing order may also include a time requirement indicating the total amount of time to be spent on the film-processing order. The time requirement may be used to schedule the film-processing order.

The film-processing requirement may be received from a different medium than the medium that includes the film. Identifying one or more resources also may include identifying an array of two or more film scanners when the process useful in fulfilling the film-processing order has a scanning component.

Identifying one or more resources may include identifying a processor structured and arranged to perform film registration when the process useful in fulfilling the film-processing order has a film registration component, identifying a processor structured and arranged to perform color correction when the process useful in fulfilling the film-processing order has a color correction component, identifying a processor structured and arranged to perform special effects when the process useful in fulfilling the film-processing order has a special effects component, and/or identifying a processor structured and arranged to perform resolution conversion when the process useful in fulfilling the film-processing order has a resolution conversion component. A schedule may be made known to an operator to indicate an assignment of the film-processing order to the resource. The operator may be polled to determine if the schedule is acceptable to the operator.

One or more alternative processing schedules may be presented to the operator. The processing schedule may be adjusted based on suggestions by the operator, and underutilized resources may be identified. One or more future resources may be identified to be added to increase a throughput of a film-processing system.

Implementations may include a system or program capable of achieving the above features, including, for instance, a resource manager, a post-production processing switch, a terminal, a host, and a network between these components.

The details of particular implementations are set forth in the accompanying drawings and the description below. Other features will be apparent from the description and drawings, and from the claims.

DESCRIPTION OF DRAWINGS

FIG. 3A is an exemplary schedule of film-processing orders.

DETAILED DESCRIPTION

In general, a resource manager may integrate one or more film-processing resources to coordinate motion picture film-processing. The resource manager may be configured to receive an order for film-processing, determine a process useful in fulfilling the film-processing order, identify one or more resources available to perform the process, and schedule the film-processing order on at least one of the identified resources.

For example, a resource manager (e.g., a server and/or a post-production processing switch) may receive a film-processing order requesting storage of a group of images generated by an array of film scanners. The resource manager may determine that the images require one terabyte of storage, identify an available storage location/device (e.g., a server or a network-attached storage device), and schedule the storing of the images with the storage location/device.

In another example, the film-processing order may request scratch removal operations that remove scratches appearing in scanned images stored on or accessible to a server. The resource manager may analyze the images and determine the processing requirements for performing the film clean up. For instance, twenty processor hours (or some other metric) may be required. The resource manager then may analyze a schedule for the order to identify particular processors to perform the scratch removal processing within the time allotted. The resource manager then may coordinate the allocation of tasks in the scratch removal processing. Thus, a first processor may be assigned a first range of frames at a first time, while a second processor is assigned a second range of frames at a second time.

Although the two examples above illustrate storing and processing operations being performed on a storage device and an array of processors, respectively, other operations and resources also may be managed. For example, the film-processing order also may be received from a digital camera, a sound stage, and one or more processors, in addition to or as an alternative to the storage devices and film scanners that were described above. Similarly, the resources leveraged to satisfy the order may include a film printer and other media writing devices, as well as other input and output devices.

Figure 1:
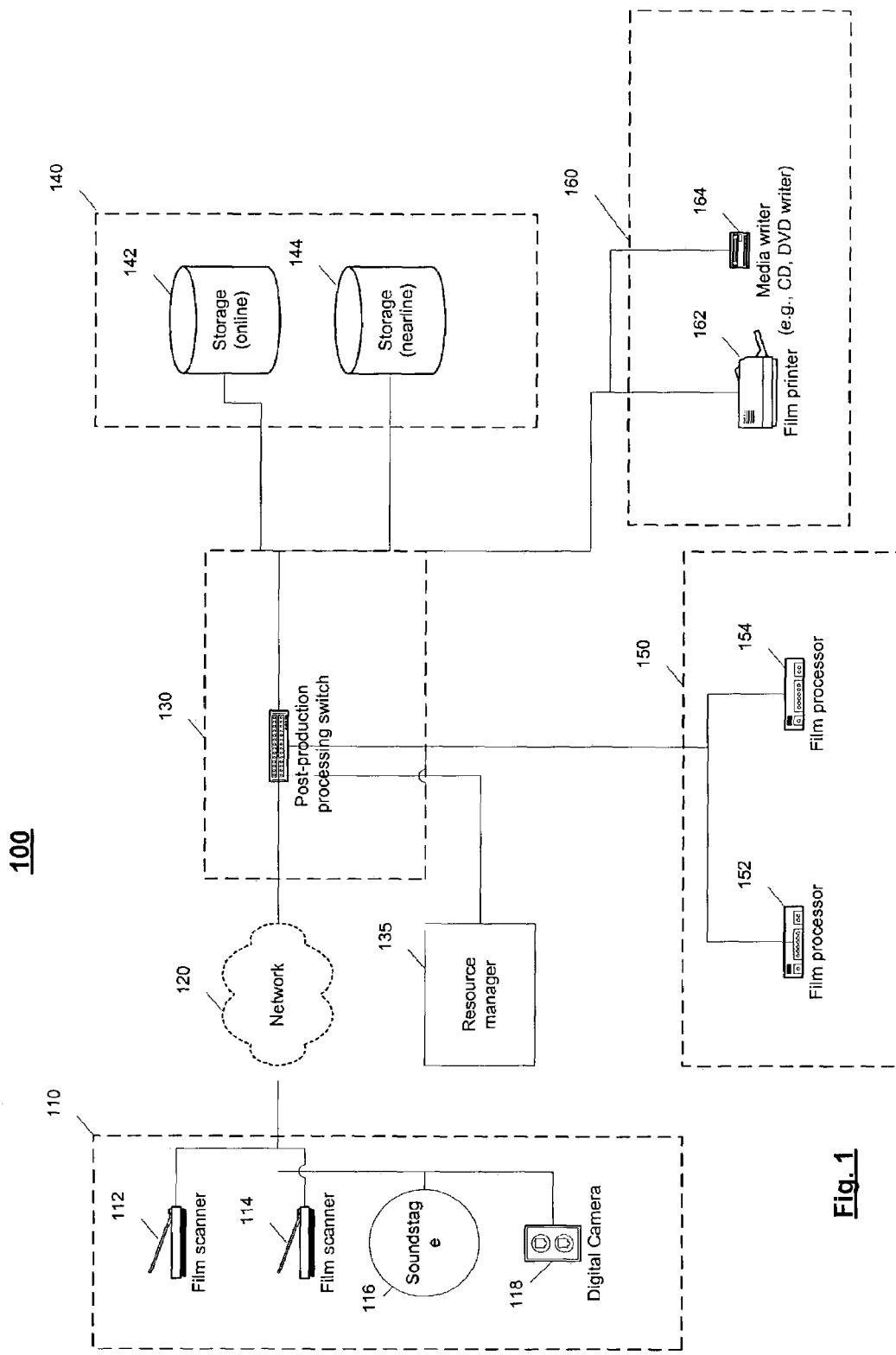
FIG. 1 is a diagram of an exemplary film-processing system configured to process a film.

Referring to FIG. 1, an exemplary film-processing system 100 is capable of receiving a film series in a first format and converting the film series to a second format. These formats may include different resolutions (e.g., 4 k resolution or 2 k resolution), different media formats (e.g., storage or film), and/or different degrees of processing (e.g., pre-special effects or with special effects). Each of these conversions may involve a film-processing order and be managed by a resource manager.

Film-processing system 100 includes an input source 110, a network 120, a post-production processing switch 130, a resource manager 135, one or more storage devices 140, one or more processors 150, and an output system 160.

Input source 110 generally includes one or more devices configured to receive analog or unprocessed data and convert that data into a film series suitable for digital processing. The input source 110 may include a film scanner 112 or an array of two or more film scanners 112 and 114. Generally, the film scanners 112 and/or 114 convert the frames of a film reel into one or more digital images. The film scanners 112/114 may serially scan one frame of the film at a time, or they may concurrently scan several frames in parallel.

When several frames are scanned in parallel, or when several film scanners are used, some additional processing may be required to perform film registration. For example, the film scanner 112 may send the film series to the post-production processing switch 130, and the post-production processing switch 130 may send the film series to the processor 150 to perform the preliminary processing. In another example, the film scanner 112 may include logic to perform the initial processing.

The input source 110 also may include a soundstage 116 and/or a digital camera 118. Depending on the configuration and properties of the equipment, a film series from soundstage 116 and/or the digital camera 118 may require different processing than a film series from the film scanner 112 or the film scanner 114. For example, registration and processing may not be required for a film series from a digital camera 118. However, where the resolution of a digital camera 118 is lower than needed (e.g., less resolution than the resolution of film scanner 112), the film series from the digital camera 118 may be processed by interpolation programs to generate a film series of a sufficiently high resolution. In another example, the film series from a digital camera 118 may require additional color correction and/or distortion processing.

Network 120 includes hardware and/or software capable of enabling direct or indirect communications between the input source 110 and the post-production processing switch 130. As such, the network 120 may include a direct link between the input source 110 and the post-production processing switch 130, or the network 120 may include one or more networks or subnetworks between them (not shown). Each network or subnetwork may include, for example, a wired or wireless data pathway capable of carrying and receiving data. Examples of the network include the Internet, the World Wide Web, a WAN ("Wide Area Network"), a LAN ("Local Area Network"), analog or digital wired and wireless telephone networks, radio, television, cable, satellite, and/or any other mechanism for communicating data. Although the network 120 is shown between the input source 110 and the post-production processing switch 130, the network 120 illustrates that other devices in the film-processing system 100 are not necessarily directly connected to the post-production processing switch 130. For example, some or all of the devices also may be connected to the post-production processing switch 130 through one or more intermediary networks, such as network 120. Likewise, some or all of the devices shown in FIG. 1 may be directly connected to the post-production processing switch 130.

Typically, the post-production processing switch 130 is configured to receive a film series, determine a state indicating an operation to be performed on the film series, identify a resource to process the film series, and interface with the resource to enable the operation to be performed on the film series. In some implementations, the post-production processing switch 130 is structured and arranged to perform filtering and forwarding between different domains at the same level of the protocol stack in the OSI ("Open System Interconnection") reference model. For example, post-production processing switch 130 may forward Ethernet frames between different Ethernet segments. In another example, post-production processing switch 130 may forward IP ("Internet Protocol") packets between different IP subnets.

The post-production processing switch 130 may include a device that performs network operations and functions in hardware (e.g., in a chip or part of chip). In some implementations, the post-production processing switch 130 may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the post-production processing switch 130 may employ a Field Programmable Gate Array (FPGA)

device, which includes a chip or chips fabricated to allow a third party designer to implement a variety of logical designs on the chip. Implementations of the post-production processing switch 130 also may employ a network processor. A network processor generally is defined to include a chip or chips that allow software to specify which network operations will be performed. A network processor may perform a variety of operations. One example of a network processor may include several interconnected RISC ("Reduced Instruction Set Computer") processors fabricated in a network processor chip. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same or similar operations.

The post-production processing switch 130 may be configured to perform protocol conversion. For example, the post-production processing switch 130 may receive from a film scanner a film series having a proprietary format. The post-production processing switch 130 may receive the film series, classify the film series, and convert the proprietary protocol into a standards-based protocol (e.g., TCP/IP ("Transport Control Protocol/Internet Protocol")).

The post-production processing switch 130 may be configured to process protocol parameters that are descriptive of the film series. For example, in a received film series, a specified offset may be used to communicate the state of the film series and/or the film-processing parameters. The post-production processing switch 130 may use the parameters to determine the state of the film series, identify an operation to be performed on the film series and/or identify a resource to process the film series. For example, a first parameter may be used to indicate the resolution of the image, the color map used, and/or the format of the image (e.g., JPEG ("Joint Photographic Experts Group") 2000). A second parameter may indicate whether film registration, special effects, resolution conversion, and/or film cleanup are required. A third parameter may be used to indicate the device on which to store, process or output the film series.

The protocol parameters may use common networking standards. For example, the film-processing parameters may be mapped onto the TCP/IP protocol. As such, the IP address may indicate the IP address of a resource in the film-processing system 100, the layer-three port number may indicate the processing or operation to be performed, and the layer-four parameters may be used to indicate additional processing requirements, such as, for example, the desired resolution and/or required processing time.

The post-production processing switch 130 may map these parameters to a protocol to enable a resource to process the film series based on the parameters in the data unit. For example, a processor 150 may be configured to automatically perform the operations (e.g., film cleanup) indicated in the data unit (IP packet) of the film series.

The resource manager 135 generally includes a device configured to coordinate the operations of available film-processing resources, such as those described in FIG. 1 (e.g., a film scanner 110, storage 140, or a processor 150). Depending on the configuration of the film-processing system 100, the resource manager 135 may include a specialized hardware device, a general-purpose computer, a program, or a combination of these.

More specifically, the resource manager 135 may be configured to receive a film-processing order, determine a film-processing requirement for the film-processing order, identify a resource capable of processing the film-processing order, and schedule the film-processing order on the resource to perform the film-processing requirement. In this configuration, the resource manager 135 includes a communications interface to interface with other systems in the film-processing system 100. For example, the resource manager 135 may receive the film-processing order in a message from a resource. Similarly, the communications interface may be used to schedule the film-processing order and to identify appropriate and available resources by polling other systems.

Although shown as a separate system in FIG. 1, the resource manager 135 may be more closely or completely integrated with other systems. For example, the resource manager 135 may include a processing blade or system in the post-production processing switch 130. Alternatively, the resource manager 135 may include a code segment or program residing on the post-production processing switch 130.

In addition, the resource manager 135 may be distributed on multiple systems. For example, the resource manager may include a controlling program residing on the post-production processing switch with distributed agents residing on the resources which are controlled.

The storage device 140 generally includes one or more devices to store the film series in its various stages. For example, the film series may be stored as the film series is being scanned. At this stage, the film series may include, for example, a multi-terabyte data set. To reduce storage requirements, portions of the film series may be stored in different states. For example, the film series may be stored to a server from an array of film scanners. The scanning process may require some length of time to process the several reels of film. As the film is being scanned, the stored film series may be sent to an array of processors to perform the film registration. Once registered, the film series may be stored over the previous unregistered images so as to eliminate the requirement to store the same images in an unregistered format. Alternatively, the unregistered images may be moved to nearline or offline storage devices for backup.

One example of a storage device 140 is a general-purpose computer (e.g., a server) capable of responding to and executing instructions in a defined manner. Other examples include a personal computer, a special-purpose computer, a workstation, a device, a component, other equipment, or some combination thereof capable of responding to and executing instructions. The storage device 140 may include and/or form part of an information delivery network, such as, for example, a data center, the Internet, the World Wide Web, an online service provider, and/or another analog or digital wired and/or wireless network that provides information.

The storage device 140 may receive instructions from a software application, a program, a piece of code, a device, a computer, a computer system, or a combination thereof that independently or collectively directs operations of the node. The instructions may be embodied permanently or temporarily in any type of machine, component, equipment, storage medium, or propagated signal that is capable of being delivered to the storage device 140.

In one implementation, the storage device 140 includes one or more information-providing software applications for accessing and transmitting requested files to the other devices in the film-processing system 100. The information-providing applications may run on a general-purpose operating system and a hardware platform that includes a general-purpose processor and/or specialized hardware. Another implementation may include a reduced operating system with both general purpose and specialized hardware. One example of a storage device 140 as a specialized device is a network-attached storage array.

A storage device 140 may run several applications, or a storage device 140 may be dedicated to one or more applications. Examples of the storage device 140 dedicated to one application include a network-attached storage device configured to respond to instructions from a peripheral device (e.g., film scanner 112, post-production processing switch 130, or processor 150).

The storage device 140 may include an online storage device 142, a nearline storage device 144, and/or an offline storage device (not shown). Generally, online storage device 142 stores the film series such that the film series can be accessed in real time. Online storage device 142 may include a server that stores the film series to memory and/or disk drives. Nearline storage device 144 stores the film series such that the film may be accessed in short order. For example, the nearline storage device 144 may include a tape drive, or a robotic array of optical media that loads and queues the tape drive data before accessing the storage media. Offline storage generally stores the film series in a mode that may require additional operator intervention. For example, the offline storage device may include tape storage that is placed in a library. For the offline data series to be accessed, a technician may be required to access and load the tape drive. Aspects of the online storage device 142, the nearline storage device 144, and the offline storage device may resemble one another as the access time improves. For example, as tape drive access times improve, the properties and performance of the tape drive may approach the performance of the server. Rather than representing fixed classes of equipment, the classification of storage devices describes possibilities for storing a film series.

The processor 150 may include an array of one or more film-processors (e.g., film-processors 152 and 154) configured to perform one or more processing operations on digital images within the film series. As such, the processor 150 may include one or more devices capable of accessing a film series and performing one or more operations on the film series. The processor 150 may include a controller (not shown) that processes instructions received from or generated by a software application, a program, a piece of code, a device, a computer, a computer system, or a combination thereof, which independently or collectively direct operations of the processor 150. The instructions may be embodied permanently or temporarily in any type of machine, component, equipment, storage medium, or propagated signal that is capable of being delivered to the processor 150 or that may reside with the controller at processor 150. Processor 150 may include a general-purpose computer (e.g., a personal computer) capable of responding to and executing instructions in a defined manner, a workstation, a component, other equipment, or some combination of these items that is capable of responding to and executing instructions.

In one implementation, the processor 150 includes one or more information retrieval software applications (e.g., a file system client) capable of receiving a film series in a variety of states. The information retrieval applications may run on a general-purpose operating system and a hardware platform that includes a general-purpose processor and specialized hardware for film-processing and/or other capabilities. In another example, the processor 150 may run a specialized operating system and/or operate on specialized hardware.

The processor 150 may be configured to enable the post-production processing switch 130 to select one of several programs, operations, or processes to be performed on the processor 150. Examples of the operations that may be performed by the processor 150 may include, but are not limited to, registration, color mapping, film cleanup, special effects, and/or resolution conversion.

The processor 150 may include a reconfigurable device capable of responding to film-processing requirements indicated by the post-production processing switch 130. For example, the post-production processing switch 130 may manage an array of 100 processors as a pool of processing commodities. Depending on the requirements of the film series and the priority of the operations, the processors may be allocated by the switch 130 to meet the priorities and/or requirements.

For example, a high priority task may include creating the product for the director's daily review. In this example, many or all of the 100 processors in the array might be allocated to perform the necessary processing. In another example, an archive of older film movies might be processed and/or remastered for re-release. In this example, each of two movies might be allocated 50 processors, absent additional tasking. If a higher priority tasking was received, then the two movies each might relinquish 30 processors to the higher priority task, with each movie being processed by 20 processors.

The output system 160 may include one or more devices configured to write the content to an output medium. In one example, the output medium may include a master film created by a film printer 162. This master film then may be used to create duplicates for distribution to cinemas. In another example, the output system 160 may include a media writer 164 (e.g., a DVD writer or a disk array for digital film distribution) designed to create digital media products for distribution.

Although the devices shown by FIG. 1 illustrate that various devices may be included in a film-processing system 100, some film-processing systems 100 may be designed with greater or fewer devices, or merely a subset of the devices shown in film-processing system 100 of FIG. 1. For example, a different film-processing system may include only an array of one or more film scanners.

Figure 2:
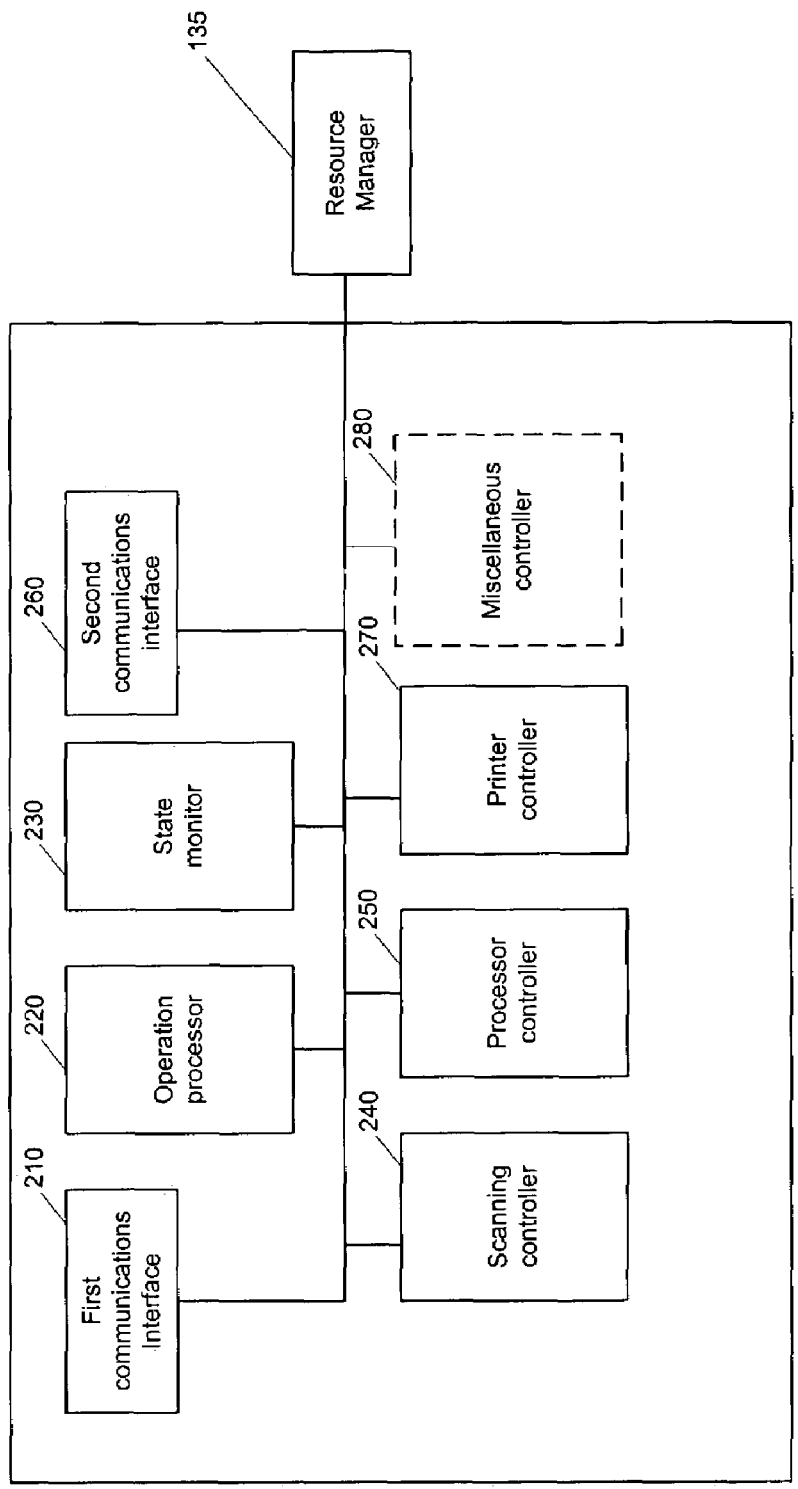
FIG. 2 is a diagram of an exemplary post-production processing switch configured to interface with one or more resources to process a film-processing order.

FIG. 2 shows an exemplary post-production processing switch 130 configured to work with a resource manager 135. Generally, the post-production processing switch 130 is configured to receive a film series, determine a state for the film series identifying one or more operations to be performed, identify one or more resources to process the film series based on the determined state of the film and/or operations identified, and interface with the resources to enable the operations to be performed on the film series. The post-production processing switch 130 may include a first communications interface 210 to receive a film series, an operation processor 220 to manage tasks on one or more processors, a state monitor 230 to control the allocation of available resources, a scanning controller 240 configured to interface with and control an array of one or more film scanners (e.g., scanners 112 and 114), a processor controller 250 configured to interface with and control an array of one or more processors (e.g., processor 150), a second communications interface 260 configured to enable the post-production processing switch 130 to exchange data with one or more resources (e.g., a storage device 140, a processor 150 and an output device 150), and a printer controller 270 configured to interface with and control one or more film printers.

Generally, the first communications interface 210 is configured to receive a film-processing order for processing. The film-processing order may be received from an input source 110 (e.g., film scanner 112, soundstage 116, digital camera 118), a storage device 140, and/or processor 150. The first communications interface 210 may receive the film-processing order directly from an input source 110, or the first communications interface may receive it from or through one or more intervening networks (e.g., network 120) and/or the storage device 140.

The first communications interface 210 may include a standards-based interface, a proprietary interface, and/or a hybrid interface combining aspects of a standards-based interface with some proprietary formatting. For example, the standards-based interface may include a Gigabit Ethernet interface. The proprietary interface may include one or more interfaces designed by a film equipment vendor to communicate film data. An example of a hybrid interface is a standards-based interface with proprietary parameters encapsulated within select fields of a standard frame.

The first communications interface 210 may or may not be required to use common data communications protocols, such TCP/IP. Other communications interfaces such as HIPPI ("High Performance Parallel Interface") may be used.

The operation processor 220 is a controller configured to receive a data unit, identify a state for the data unit, and determine one or more operations related the state of the data unit. The post-production processing switch 130 may classify the data unit, identify one or more parameters in the attribute portion of a data unit, and map those parameters into processing requirements. For example, the operation processor 220 may look at certain parameters in the protocols and determine that the film series needs to be stored using, for example, storage device 140. In another example, the operation processor 220 may examine parameters and determine that a film cleanup operation needs to be performed using, for example, processor 150.

Typically, the state monitor 230 is configured to maintain the state of resources in the film-processing system 100. For example, the state monitor may determine that all of the film scanners are in use, real time storage is 75% full, nearline storage is 30% full, offline storage is 2% full, and 30 of 100 processors are being used on a job printing of five (e.g., to perform film cleanup).

The state monitor 230 may maintain the state of resources in several ways. For example, the post-production processing switch 130 may track the state of connections and parameters through the switch, and from the state of the connections and parameters, determine which resources are being used for what purpose. Alternatively, the post-production processing switch 130 may maintain a connection to resources that are leveraged to determine the state for a particular resource. The connection may be maintained through in-band or out-of-band communications. In-band communications may include using the same channel and/or circuit that is being used to transmit the film series. Out-of-band communications may include setting up a separate connection (e.g., through an Ethernet port dedicated to management) to manage the different devices, and may be used to avoid in-band congestion.

The scanning controller 240 is an interface configured to control the film scanning process in an array of one or more film scanners. For example, the scanning controller 240 may monitor parameters in a film series received from a film scanner 112 to determine the state of the scanning process. The scanning controller 240 may transmit one or more data units to the film scanner 112 to support the scanning process. In one example, the scanning controller 240 may send acknowledgments to the film scanner 112 so that the film scanner 112 may advance to the next series of images at an appropriate relative time. In another example, the scanning controller 240 may send a message to cause a particular image is rescanned.

Generally, the processor controller 250 is configured to interface with an array of one or more processors to control an array of operations that may be performed on the processors 150. Interfacing with the processors may include instructing the processor to perform a designated operation on a designated data set (e.g., a portion of the film series). For example, the processor controller 250 may instruct the array of processors to perform designated special effects on a specified range of frames.

The processor controller 250 may interface with a management code segment running on one or more processors to maintain the state of the processor and to control the operation of the processor 150. For example, the processor controller 250 may select one of five programs to run on the processor. The processor controller 250 then may select one or more parameters for the selected program. Also, the processor controller 250 may select multiple programs to run simultaneously on the processor 150. In addition, the processor controller 250 may select priorities for these programs so that one program may be allocated more processing resources more quickly or abundantly than a second program.

Alternatively, the processor controller 250 may "swap out" the processing of a first film series running on the processor 150 and replace the processing of the first film series with the processing of a second film series.

The second communications interface 260 may be configured to exchange data with one or more resources. Generally, aspects of the second communications interface 260 may be configured to relate to aspects of the first communications interface 210 described previously. However, the second communications interface 260 interfaces with the resource performing the identified operation rather than receiving the film series.

Generally, the printer controller 270 is a controller configured to interface with one or more film printers to print the film series. Because film printing may be a monolithic process within a reel, once a printing session has begun for a reel, the film printer may be busy processing that film series for a length of time (e.g., hours or days). This may require additional planning for printing as the film reel cannot easily be changed out to accommodate a higher priority request. For example, the printer controller 270 may interface with the operation processor 220, and the state monitor 230 to determine that there are no higher priority jobs in the queue of film series to be processed.

There may be one or more miscellaneous controllers 280 configured to control one or more peripheral devices, such as, for example, a soundstage 116, a digital camera 118, the storage device 140, and/or a media writer 164. Aspects of a miscellaneous controller 280 may resemble aspects of the other controllers described previously (e.g., the scanning controller 240, the processor controller 250, and/or the printer controller 270).

Figure 3:
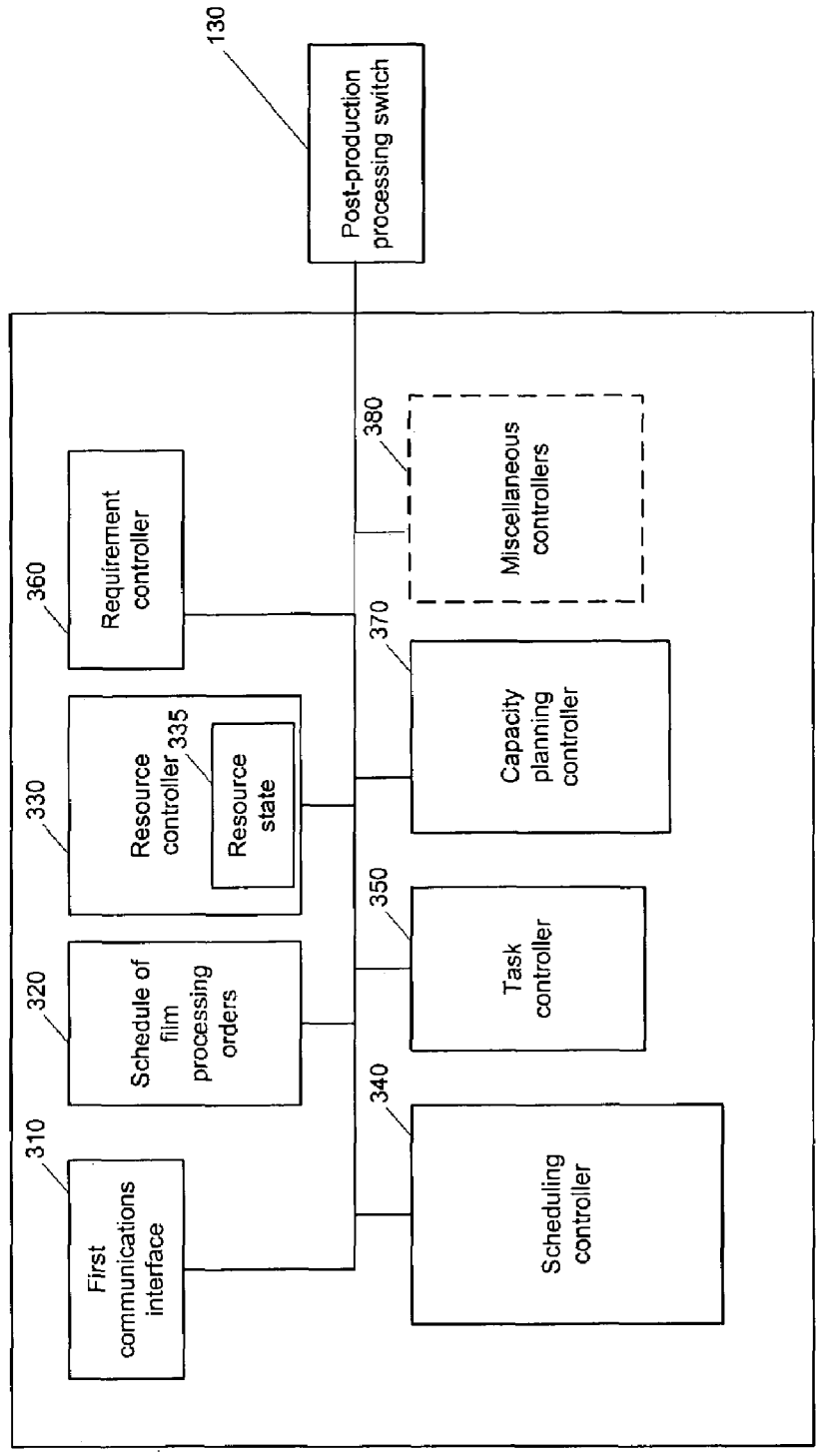
FIG. 3 is a diagram of an exemplary resource manager configured to manage a film-processing system with one or more resources.

FIG. 3 shows a resource manager 135 configured to manage film-processing resources. Generally, the resource manager 135 is configured to receive a film-processing order, determine a process useful in fulfilling the film-processing order, identify one or more resources available to perform the process useful in fulfilling the film-processing order, and schedule the film-processing order on the resource. Resource manager 135 includes a first communications interface 310 to receive a film-processing order, storage 320 for managing a schedule of film-processing orders, a resource controller 330 to determine a state for one or more resources, a scheduling controller 340 to manage a schedule, a task controller 350 configured to launch a film-processing order, a requirement controller 360 configured to translate a received order into a resource requirement, a capacity planning controller 370 to manage capacity planning issues, and one or more miscellaneous controllers 380.

Generally, the first communications interface 310 is configured to receive a film-processing order. Aspects of the first communications interface 310 may resemble aspects of the first communication interface 210 of the post-production processing switch 130. However, the first communications interface 310 exchanges a film-processing order instead of a film series. Still, notwithstanding these differences, the first communications interface 310 may be identical and/or share common components, particularly if the film-processing order parameters are encoded in the film series. For example, the film-processing order may be received as network parameters in a received film series.

The first communications interface 310 may receive a film-processing order from the systems described in FIG. 1. For example, the film-processing order may be received from an input source 110 (e.g., a film scanner 112), a post-production processing switch 130, a storage device 140, a processor 150, and/or an output system 160.

For example, as a film series is processed by a processor 150 performing resolution conversion, the packets that encapsulate the film series may indicate how the film series should be stored. Thus, a TCP port number may indicate that the film series should be stored in online storage.

The storage 320 includes a memory component configured to store a schedule of one or more film-processing orders. Generally, the storage 320 for managing a schedule of film-processing orders includes an order identifier, a list of one or more resources scheduled to process the film-processing order, and a time identifier indicating when the resources will perform the film-processing order. The order identifier may include a serial number associated with a film that has been received. In another example, the order identifier may include a film title and/or one or more parameters descriptive of the state of the film. For example, the order identifier may include a list of processing sequences with each processing sequence describing a portion of content in the film (e.g., frames 1–1800) and the state of processing (e.g., the portion has been registered and undergone cleanup, but requires special effects and resolution conversion).

The list of resources scheduled to process the order may include resource identifiers that identify particular resources that are reserved to work on the film-processing order. For example, resource identifiers may indicate that 20 specified film scanners are scheduled for use during the film scanning process. In another example, the list of resources may identify particular resources and indicate the operation to be performed by each. For example, the list of resources may include identifiers for an array of processors to perform film registration.

The time identifier may include a list of one or more time slots when the list of resources should perform the film-processing order. For example, the time identifier may use a first processor in a first time slot to perform special effects on a first portion of a film-processing order, and use a second processor in a second time slot on a second portion of the film-processing order. Other parameters also may be associated with the schedule. For instance, parameters may include a priority, a level of detail required (e.g., high, medium, or low level of details for special effects), a selection of algorithms (e.g., which film registration algorithm to use), time requirements, a resolution, a format, and/or other parameters. These parameters may reside in the schedule itself, or these parameters may be referenced in another location. For example, a schedule may include a serial number and a time descriptor, such that the related parameters may be accessed in a record that is associated with the serial number and that therefore may be retrieved by accessing the record based on the serial number.

Depending on the configuration of the resource manager 135, the schedule of film-processing orders in storage 320 may reside in, for example, a code segment, an index in memory, or an array on a disk drive.

The resource controller 330 maintains the resource state 335 of the resources in the film-processing system 100. Generally, the resource state 335 describes an ability of a resource to process a film-processing order. Aspects of the resource state 335 may resemble aspects of the schedule in storage 320. For example, the resource state 335 may indicate that a resource is busy until a specified time. However, depending on the configuration of the resource state 335, the resource manager 135 may be used to manage connections and film-processing orders dynamically. For example, if a film-processing order finishes early and a resource is idle, the resource manager 135 may check the resource state 335 to determine if the now-available resource can be used to perform an existing film-processing order during the remaining free time. In another example, the schedule of film-processing orders 320 may include a queue of tasks to be performed without allocated times. To process the queue, the resource manager 135 may assign film-processing orders based on the resource state 335.

The resource state 335 may be maintained by, for example, polling resources, analyzing the flow of data through a post-production processing switch 130, and/or maintaining a connection to the resources.

Depending on the configuration of the resource manager 135, the resource state 335 may reside in, for example, a code segment, an index in memory, or an array on a disk drive. The resource state 335 may share one or more resources or components with the schedule of film-processing orders of storage 320.

The scheduling controller 340 includes a component configured to determine a schedule by which film-processing orders may be related to resources. Generally, the scheduling controller 340 identifies a resource to perform a film-processing order at a certain time. The scheduling controller 350 may rearrange the scheduling dynamically as new film-processing orders are received. For example, a film-processing order for a director's daily review may be received that requires scheduled film-processing order reallocation.

The scheduling controller 340 may communicate or otherwise interface with an operator to inform the operator of the schedule of film-processing orders. In one example, the scheduling controller 340 may indicate that a film-processing order will be performed at a time later than a specified normal range of operations. The scheduling controller then may prompt the operator to reallocate the processing resources.

The scheduling controller 340 also may interface with an operator to inform the operator of one or more changes to the film-processing order. For example, the scheduling controller may send a message, a popup window, or a display to the operator to inform the operator of the dynamic reallocation of resources. The operator may be prompted to verify the reallocation.

The task controller 350 generally is configured to interface with a resource to launch a scheduled film-processing order. In one example, the task controller 350 may be configured to transmit a schedule for a given resource to that resource, so as to make the resource aware of its schedule in advance of upcoming tasks and deadlines. In another example, the task controller 350 interfaces with the resource at the scheduled time to launch the film-processing order.

The requirement controller 360 may be used to translate an order that is received into a resource requirement. Depending on the format in which the order is received, additional determinations may be made to appropriately schedule the order. For example, the order may be received with a file size and an operation to be performed. The requirement controller 360 may determine this order requires a certain number of hours and/or a certain number of processors.

The resource manager 135 optionally may include a capacity-planning controller 370. The capacity planning controller 370 generally is configured to identify one or more under or over-utilized resources. For example, the capacity-planning controller 370 may indicate that a film printer is being underutilized. The capacity-planning controller 370 then may include a list of recommendations for how the utilization of the underutilized resource may be increased. The recommendations may include options enabling an operator to select one or more recommendations to increase utilization. In another example, the capacity-planning controller 370 may determine that some operations are being performed needlessly. For example, special effects may be performed at a high level of detail when the output products only require a lower level of detail. The capacity-planning controller 370 may inform the operator that resources could be made available by lowering the level of detail specified.

The capacity-planning controller 370 also may identify one or more resources that may be added to increase the efficiency of a film-processing system. For example, adding a certain number of processors may eliminate bottlenecks that occur while performing special effects. In another example, the capacity-planning controller 370 may be configured to enable the operator to access external resources outside of the film-processing organization to perform film-processing operations. For example, a larger organization may include a film-processing system 100 in addition to other data processing systems (e.g., service provider systems, enterprise support systems). The capacity-planning controller 370 may be configured to determine whether non-film-processing system resources are available (for example, whether additional storage is available elsewhere). In another example, a service provider may lease film-processing resources from across the Internet. The operator may be prompted to determine if the operator would like to access these external resources to perform a film-processing operation.

Aspects of the resource manager 135 may relate to aspects of the post-production processing switch 130. For example, when the post-production processing switch 130 receives a film series, the received film series also may represent a film-processing order with the post-production processing switch 130 also acting as a resource manager 135. Though the two systems may be implemented using the same device and the same operations, the post-production processing switch 130 describes how a stream of data units may be processed in a film-processing environment whereas the resource manager 135 describes managing the resources within the film-processing environment. The distinction may represent an arbitrary and artificial boundary used to describe constituent elements rather than an actual separation. For example, a system may receive a film series and allocate resources to process the film series. Similarly, a system managing resources may manage network traffic (e.g., a film series) based on the state of the managed resources.

FIG. 3A illustrates an exemplary schedule 322 that may be used to manage resources. Schedule 322 includes rows 324, 326, and 328 indicating three orders to be processed. Each row includes an order ID, a list of resources to process the order, and a schedule for processing.

For example, row 324 describes order A which will use scanners C1–C10 between time T1 and time T2. In this example, identifying the scanners effectively serves to identify the operation to be performed. However, additional parameters may describe the resolution and/or identify more precisely the task to be performed.

Row 326 describes order B, which will use processors P1–P50 between time T3 and T4. The schedule need not specify the operation to be performed. For example, the operation to be performed may be stored with the film series, and/or derived from the state of the film series or the device from which the film series is received.

Row 328 describes order C which also uses processors P1–P50. However, order C is scheduled at a later time between times T4 and T5. In this manner, maximum use of resources may be attained by coordinating the scheduled use of resources.

Figure 4:
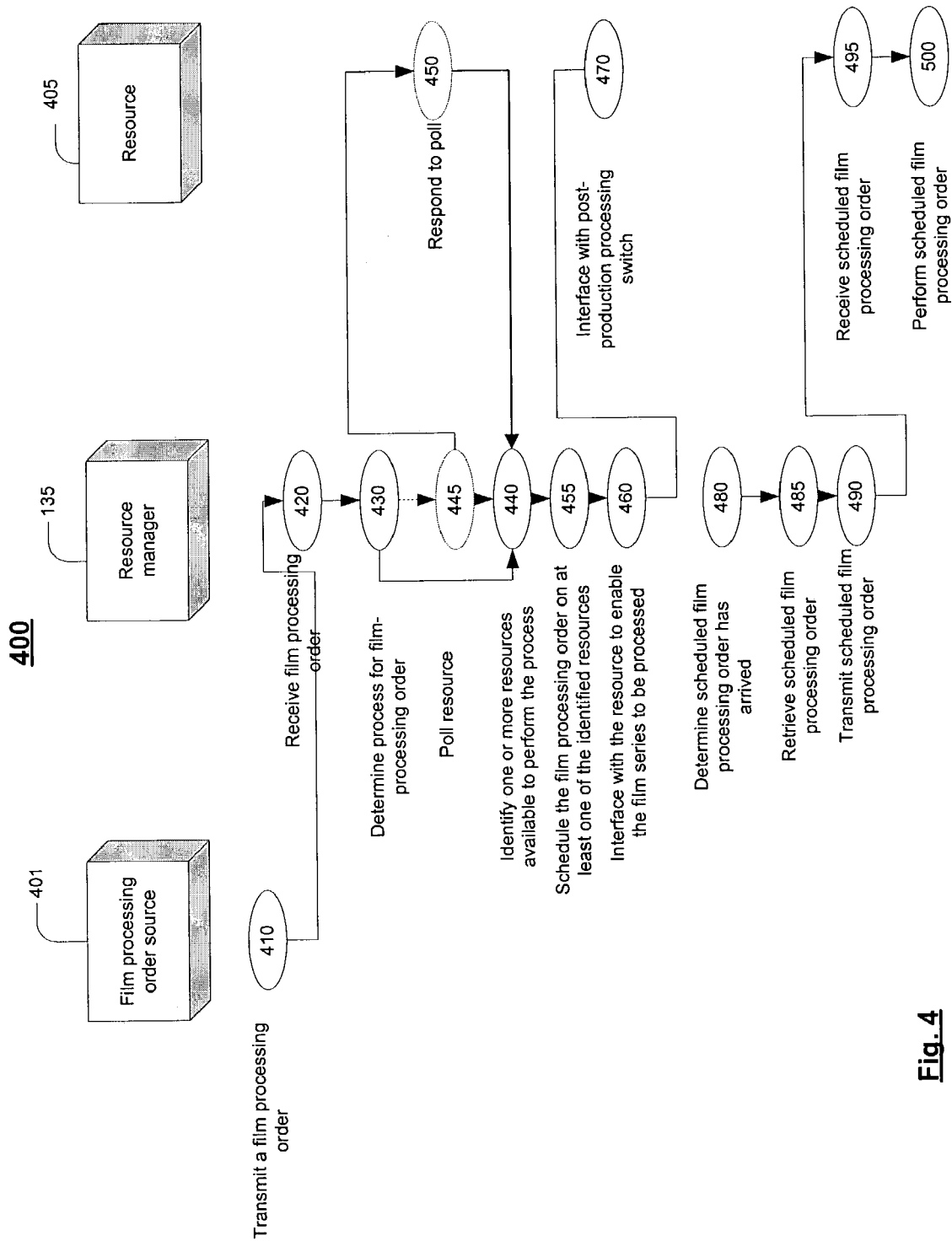
FIG. 4 is, a flow chart illustrating an exemplary process of managing resources.

Referring to FIG. 4, a flow chart 400 shows how a resource manager 135 may be used in a process for scheduling a film-processing order to be processed. Specifically, the resource manager 135 receives a film-processing order from a film-processing order source 401 and schedules the film-processing order to be performed by the resource 405 to satisfy that order. Aspects of the film-processing system described in FIG. 4 have generally been described previously. In particular, the film-processing order source 401, resource manager 135, and resource 405 generally relate to aspects of the film systems described previously with respect to FIGS. 1–3. For example, the film-processing order source 401 may resemble or include the input source 110, the storage device 140, and/or the processor 150. Similarly, the resource 405 may resemble or include the storage device 140, the processor 150, and/or the output system 160. However, FIG. 4 illustrates a process for integrating how the specific systems and their operations are combined to enable the resource manager 135 to schedule the film-processing orders operation.

Initially, the film-processing order source 401 transmits a film-processing order to the resource manager 135 (step 410). Transmitting the film-processing order involves notifying the resource manager of a pending film-processing order in an automated manner. For example, a film reel may be loaded into a film scanner 112 with film information encoded in the first portion of the reel. This film information may be incorporated into a film-processing order and read by the scanner.

Although transmitting processing order is shown as originating from the film-processing order source 401, the film-processing order may be received on a different system than the system used to receive the film. For example, a film may be received by an operator loading a film reel into a scanner, while the film-processing order may be received from a management workstation used by the operator. The operator then may tell the management workstation that the film has been loaded into a film scanner.

In another example, the film reel may be loaded into a film scanner 112. As the film scanner 112 is loaded, an operator may be prompted for one or more parameters to be entered into the film-processing order. For example, the operator may be polled for the film name, resolution information, reel identification information (e.g., film reel one of six), logistic information (e.g., a reel serial number), and/or film quality information (e.g., archived footage that should be scanned at lower speeds and/or tensions). The operator also may be prompted for one or more film-processing requirements that may be added into the film-processing order and/or stored separately. For example, the operator may be prompted for priority information (i.e., information indicating whether the film should be processed on a resource before other films or film-processing orders). The operator also may be prompted for date and/or time requirements. For example, in the case of producing the director's daily review footage from that day, the film may need to be processed by 6:00 AM every morning. Accordingly, the operator may input a date requirement describing this deadline. In another example, the operator may be trying to print a film on a film printer. Typically, printing on a film printer involves using an expensive film printer that performs tasks that cannot easily be changed once printing a film has begun. Accordingly, the operator may allocate six hours to printing one reel of a film. The remainder of the film not printed on that reel within that allotted time may be printed at a later time and/or on another reel.

The operator may enter one or more tasks for a given portion of film. For example, the operator may identify film registration, special effects, color correction, and/or film and dust cleanup as tasks that need to be performed on one or more portions of a film. For example, the operator may indicate that frames 1000–1600 need to undergo interpolation processing to create finer granularity.

The parameters in the film-processing order and/or film-processing requirements need not be entered by an operator or by receiving the film. For example, a studio may identify optimal settings and operations that may be performed on more than one film. For example, if a film archive of older movies is being digitally remastered, the studio may determine that predetermined dust and cleanup parameters work well across all films in that archive.

The resource manager 405 receives the film-processing order (step 420). Receiving the film-processing order generally involves receiving a message, file, code segment, or packet indicating that a piece of content requires processing. For example, a post-production processing switch may receive a packet with film content, and having TCP/IP parameters that are descriptive of the film-processing order. The post-production processing switch may correlate the parameters in the packet with a film-processing order. For example, the layer-four port number may serve as a location identifier for the piece of content that needs to be stored.

Receiving the film-processing order (step 420) may or may not involve concurrently receiving the film or related content. For example, an operator may load a reel of film to a library of reels accessible by a robotic controller. Loading the reel may launch a code segment that schedules the reel to be scanned at a later time.

Based on the received film-processing order, the resource manager 135 determines a process useful in fulfilling the film-processing order (step 430). Determining a process useful in fulfilling the film-processing order may include determining a film-processing requirement. Determining a film-processing requirement generally includes determining one or more parameters describing how a film should be processed. For example, the film-processing requirement may include a description of the type of processing to be performed (e.g., scanning, registration, special effects, dirt and dust cleanup, storage, printing, or writing to a digital medium), one or more parameters within the processing to be performed (e.g., a frame rate, a resolution, or a type of algorithm used on a processor for a certain operation), priorities, date requirements, and/or time requirements.

Parameters in the attribute portion of a data unit (e.g., the TCP port number) may be accessed to determine the process useful in fulfilling the film-processing-order. For example, the resolution may be specified by setting the TCP port number to a label (e.g., TCP port 1) associated with a specific resolution (e.g., 4,000×2,000 pixel resolution). In another example, the layer-three parameter may be used to specify the horizontal resolution (e.g., 4000 pixels) while another layer-three parameter is used to specify the horizontal resolution (e.g., 2000 pixels).

Determining the process (step 430) also may include accessing a data store of film-processing requirements. For example, a film-processing order may be received with a film serial number. The film serial number may be accessed in a data store to retrieve film-processing requirements.

Determining the process useful in fulfilling the film-processing order (step 430) may include correlating several parameters to create a proxy parameter. For example, a film-processing order may be received with a parameter indicating a deadline (e.g., on a certain date at a certain time in a certain format). This deadline parameter may be related to the available resources and their processing power to determine how many of the processors may be required to meet the processing deadline. In another example, the resource manager may calculate the time required to perform the operations at different levels of granularity and/or accuracy. For example, a fine level of granularity may require X hours, while medium and basic granularity may require X/2 and X/4 hours.

Aspects of the film-processing requirements may be related to and/or performed in conjunction with parameters of the film-processing order. For example, receiving the film-processing order (step 420) may include receiving parameters descriptive of how the film is to be processed. Similarly, for example, prompting an operator when creating the film-processing order may include prompting the operator for parameters descriptive of how the film is to be processed. The parameters entered in the film-processing order also may be used as parameters for determining the film-processing requirement (step 430).

As an optional step, the resource manager 435 may poll the resource (step 445), which then responds to the poll (step 450). Generally, polling the resource may include determining the ability of the resource to accommodate the film-processing order in accordance with the film-processing requirement. For example, the resource manager 135 may poll processors to determine if they are available and the priority of tasks being performed by each. In another example, the polling may be performed periodically so that the polling is not performed in response to receiving a film-processing order. In yet another example, resource manager 135 may maintain a connection to the resource 405 to track the state of the resource. One or more proxies may be used. For example, a management node may maintain connections to the resources. The resource manager 135 then may probe the management node to determine the state of one or more resources.

The resource manager 135 identifies a resource capable of performing the operation (step 440). Identifying a resource may include identifying both a resource assigned to process the film-processing order and a time when the resource can process the film-processing order. Identifying a resource may include identifying more than one resource and/or type of resource. For example, the resource manager 135 may identify a collection of processors to process a film-processing order. In another example, the resource manager 135 may identify more than one type of equipment. For example, the resource manager 135 may identify a film scanner 112 to scan in a film associated with a film-processing order, one or more processors 150 to perform the various types of processing, a storage device 140 to store the film-processing order after the different types of processing, and a film printer 162 to print the film. Identifying the processors may include identifying a first processor (or set of processors) to perform film registration, identifying a second processor (or set of processors) to perform film and dust cleanup, identifying a third processor (or set of processors) to perform special effects, and identifying a fourth processor (or set of processors) to convert the resolution of the film-processing order. The first processor may be the same processor as the second, third, and/or fourth processors. However, identifying the different processors illustrates that multiple types of film operations may be identified when identifying a resource.

Identifying a resource (step 440) may include identifying a resource currently assigned to a film-processing order with a relatively lower priority than the current film-processing order. In one example, when a film-processing order with a relatively higher priority is received, one or more resources processing or scheduled to process an order with a relatively lower priority are identified. In one example, the lower priority film-processing order is suspended and the state of the operations is saved to a storage device 140 so that the lower priority film-processing order may be subsequently resumed. In another example, the lower priority film-processing order may still be processed, but may be allocated less processing time on the resource. This may be accomplished, for example, by reducing the percentage of processing time dedicated to the lower processing task (e.g., from 50% to 20%).

The resource manager 135 schedules the film-processing order on the resource (step 455). Scheduling the film-processing order generally includes allocating a certain time on a certain resource(s) to process the film. In one example, scheduling the film-processing order involves allocating fixed-length resource processing time slots. For example, the time on a processing resource may be divided into time slots that are one hour long. The hour-long time slots then might be allocated, independent of whether the film-processing order will require more or less time than the allocated hour.

In another example, the film-processing order may be scheduled with a higher degree of granularity. For example, scheduling the film-processing order may include determining how much time is required to perform the film-processing order, and allocating this amount of time on the resource. The allocated time may be supplemented with some additional time to allow for a margin of error.

Scheduling the film-processing order may include scheduling the film-processing order on multiple systems and/or at multiple times. For example, a lower priority film-processing order may be broken down into several scheduled tasks so that it may be executed between lulls in higher priority activities.

The resource manager 135 interfaces with the resource to enable the film-processing order to be processed (steps 460). In turn, the resource interfaces with the post-production processing switch 130 (step 470). Interfacing with the resource may include launching a code segment, job, or program that will perform one or more operations in the film-processing order. For example, interfacing with the resource may include directing the storage device to store a film-processing order for subsequent processing. In another example, interfacing with the resource may include determining the relative priorities of two or more operations and related films, and directing the operation be performed on the resource to reflect the relative priorities. Reflecting the priority may include determining a state and data set for a lower priority operation and saving that state and data set to storage to enable the lower priority job to be subsequently launched from where the lower priority job was saved.

Interfacing with the resource may include indicating the location from where a resource should access a film. For instance, the resource manager 135 may transmit a location identifier (e.g., pointer or directory) that identifies a location from which a subset of the film-processing order may be retrieved. Alternatively, interfacing with the resource may include transmitting a film-processing order with parameters in the film-processing order describing the job to be performed. For example, the film-processing order may include a series of TCP/IP packets being sent to a processor 150. The layer-four information in the packets may be used to indicate the operations to be performed on the processor 150.

The resource manager 135 may determine that a scheduled film-processing order has arrived (step 480). Determining that a film-processing order has arrived may include periodically polling a scheduling data store to determine if a film-processing order should be launched. Although determining that the scheduled film-processing order has arrived is illustrated as occurring on a resource manager 135, the determination also may be made by other systems, such as, for example, a post-production processing switch 130 and/or a resource 405. For example, the resource 405 may maintain a schedule of film-processing orders that is periodically polled to determine whether a film-processing order should be processed.

When a film-processing order has arrived, the resource manager may retrieve the scheduled film-processing order (step 485). Retrieving the scheduled film-processing order may include retrieving one or more film-processing requirements. The resource manager 135 transmits the scheduled film-processing order (step 490) to the resource 405, which then receives the scheduled film-processing order (step 495). The resource then performs the scheduled film-processing order (step 500).

Other implementations are within the scope of the following claims. For example, the resource manager may be distributed across one or more devices in the film-processing system. For example, the schedule of film-processing orders may be maintained on a management workstation while the resource controller is maintained on a post-production processing switch.

The operations have been described with respect to a film studio. However, the operations also may be used in other imaging operations (e.g., medical imaging and satellite applications). For example, a medical imaging scanner (e.g., a MRI ("Magnetic Resonance Imaging") or a CAT ("Computer Axial Tomography") device) may be used to generate images and the film-processing order. These images may be used as a film series, and processed by a post-production processing switch. Although different operations may be used, the architecture and techniques described previously may be used. Similarly, in satellite operations, the content being exchanged across a satellite link may be processed as a film series, even though a film studio may not produce the content.

The resource manager may work to identify post-production processing defects or events. For example, the resource manager may direct a film series associated with a film-processing order to an array of processors performing image analysis. The processors may determine that a defect exists in some frames. The resource manager may work to isolate the defect. For example, the resource manager may perform log filtering and determine that a scanner is the source of a flaw. The resource manager then may coordinate the response to an identified defect. For example, when the defect is a fault in a scanning head in a multi-scanning head system, the resource manager may direct the scanning system to rewind the film and rescan the frames using an alternate scanning head. The film may subsequently compensate for the flawed scanning head and reconfigure the film scanner so that the frames are not scanned by the defective scanning head. Alternatively, the resource manager may schedule additional processing to correct the flaws associated with the defect.

The resource manager may work with a post-production processing switch to detect defects as data is received and processed by a post-production processing switch. For example, the post-production processing switch may analyze the data flow from several scanners and determine that one of the scanners is associated with a reduced data rate. The post-production processing switch may identify the reduced rate scanner as flawed and coordinate subsequent processing to minimize the impact of the defect.

The resource manager may direct one or more processors to perform image content analysis. The image content analysis may be used to coordinate subsequent processing. For example, the post-production processing switch may receive a film-processing order with an incomplete state. The film series associated with the film-processing order may undergo image content analysis to determine the state of the film series. For example, the various color components may be derived and used to control subsequent processing. The state of the film series then may be used to schedule resources and subsequent processing. The state then may be written to a file header, or metadata descript of the film series and/or film-processing order.

The resource manager may receive automated measurements descriptive of the film-processing environment. These automated measurements may be used for subsequent processing. For example, the lighting, humidity, and temperature may be precisely controlled and gauged during actual production and also during post-production processing. These values may be encoded into metadata descriptive of the production environment and used by the resource manager to schedule post-production processing. For example, if a scene was filmed under certain conditions, the resource manager may schedule a processor to insert special effects aligned to the environmental conditions that existed during production. Thus, the lighting on a computer-generated object may relate to the actual lighting used in the studio. Alternatively, the resource manager may schedule two film series from two different scenes and environmental conditions to be processed so that the two scenes may be merged appear and appear as one seamless scene.

What is claimed is:

1. A method of managing motion picture film-processing resources, the method comprising:
   receiving a motion picture film-processing order to process a motion picture film;
   determining a first interruptible post-production process on the motion picture film useful in fulfilling the motion picture film-processing order;
   identifying first resources available to perform the first interruptible post-production process;
   scheduling with the identified first resources to perform the first interruptible post-production process;
   sending the motion picture film to the first resources available to perform the first interruptible post-production process;
   receiving a processed motion picture film from the first resources;
   determining a second interruptible post-production process on the processed motion picture film useful in fulfilling the motion picture film-processing order, wherein the second interruptible post-production process is different from the first interruptible post-production process;
   identifying second resources available to perform the second interruptible post-production process;
   scheduling the second interruptible post-production process with the second resources; and
   sending the processed motion picture to the second resources to perform the second interruptible post-production process.

2. The method of claim 1 wherein the first or second interruptible post-production process includes a film registration operation.

3. The method of claim 2 wherein the first or second interruptible post-production process includes scanning in a reel of film.

4. The method of claim 3 wherein the first or second interruptible post-production process includes converting the film from a first resolution to a second resolution.

5. The method of claim 3 further comprising determining a priority for the first or second interruptible post-production process, wherein the priority is used as a basis for the scheduling.

6. The method of claim 5 wherein the priority is used to identify the first or second resources.

7. The method of claim 5 wherein the motion picture film-processing order is scheduled to be performed before a previously-received film-processing order if the first or second interruptible post-production process is determined to have a higher priority than a process associated with the previously received film-processing order.

8. The method of claim 1 wherein receiving the motion picture film-processing order includes receiving an IP packet with a motion picture film-processing requirement encapsulated in an attribute portion of the IP packet.

9. The method of claim 8 wherein the film-processing requirement includes determining a state of processing for the motion picture film, determining a film-processing operation to be performed on the motion picture film, and using the film-processing operation to generate the film-processing requirement.

10. The method of claim 1 wherein the motion picture film includes one or more reels of a film.

11. The method of claim 10 wherein receiving the motion picture film includes receiving a film reel from a robotic array of two or more film reels enabling the film reel to be accessed.

12. The method of claim 1 wherein the motion picture film-processing order comprises a date requirement indicating a date and time by which the motion picture film-processing order is required to be performed.

13. The method of claim 12 wherein the date requirement is used to schedule the motion picture film-processing order.

14. The method of claim 1 wherein the motion picture film-processing order comprises a time requirement indicating the total amount of time to be spent on the motion picture film-processing order.

15. The method of claim 14 wherein the time requirement is used to schedule the motion picture film-processing order.

16. The method of claim 1 wherein the motion picture film-processing order is received from a different medium than a medium that includes the motion picture film.

17. The method of claim 1 wherein identifying the first or second resources includes identifying an array of two or more film scanners when the motion picture film-processing order has a scanning component.

18. The method of claim 1 wherein identifying the first or second resources includes identifying a processor structured and arranged to perform film registration when the motion picture film-processing order has a film registration component.

19. The method of claim 1 wherein identifying the first or second resources includes identifying a processor that is structured and arranged to perform color correction when the motion picture film-processing order has a color correction component.

20. The method of claim 1, wherein identifying the first or second resources includes identifying a processor that is structured and arranged to perform special effects when the motion picture film-processing order has a special effects component.

21. The method of claim 1 wherein identifying the first or second resources includes identifying a processor that is structured and arranged to perform resolution conversion when the motion picture film-processing order has a resolution conversion component.

22. The method of claim 1 further comprising making a schedule known to an operator indicating an assignment of the motion picture film-processing order to the first or second resources.

23. The method of claim 22 further comprising polling the operator to determine if the schedule is acceptable to the operator.

24. The method of claim 22 further comprising presenting one or more alternative processing schedules to the operator.

25. The method of claim 22 further comprising adjusting the processing schedule based on suggestions by the operator.

26. The method of claim 1 further comprising identifying underutilized resources.

27. The method of claim 1 further comprising identifying one or more future resources to be added to increase a throughput of a film-processing system.

28. The method of claim 1 wherein identifying the first or second resources includes identifying a processor that is structured and arranged to perform image content analysis when the process useful in determining the motion picture film-processing order has an image content analysis component.

29. The method of claim 1 wherein identifying the first or second resources includes identifying a processor that is structured and arranged to perform compression when the process useful in determining the film-processing order has a compression component.

30. A resource manager configured to process motion picture films, the resource manager comprising:
    a first communications interface structured and arranged to receive a motion picture film-processing order to process a motion picture film;
    a requirement controller structured and arranged to determine a first interruptible post-production process on the motion picture film useful in fulfilling the motion picture film-processing order;
    an identification controller structured and arranged to identify first resources available to perform the first interruptible post-production process;
    a scheduling controller structured and arranged to schedule the first interruptible post-production process with the identified first resources; and
    a processing module structured and arranged to:
        receive a processed motion picture film from the first resources;
        determine a second interruptible post-production process on the processed motion picture film useful in fulfilling the motion picture film-processing order, wherein the second interruptible post-production process is different from the first interruptible post-production process;
        identify second resources available to perform the second interruptible post-production process;
        schedule the second interruptible post-production process with the second resources; and
        send the processed motion picture to the second resources to perform the second interruptible post-production process.

31. The resource manager of claim 30 wherein the processor is structured and arranged to perform image content analysis.

32. The resource manager of claim 30 wherein the processor is structured and arranged to perform image compression.

33. The resource manager of claim 30 wherein the first or second interruptible post-production process includes performing film registration.

34. The resource manager of claim 30 wherein the first or second interruptible post-production process includes scanning in a reel of film.

35. The resource manager of claim 30 wherein the first or second interruptible post-production process includes converting the film from a first resolution to a second resolution.

36. The resource manager of claim 30 wherein the motion picture film-processing order comprises a location identifier enabling access to the film.

37. The resource manager of claim 30 wherein the first or second interruptible post-production process is associated with a priority, wherein the priority is used by the scheduling controller.

38. The resource manager of claim 37 wherein the scheduling controller is structured and arranged to schedule the motion picture film-processing order before a previously-received film processing order if the first or second interruptible post-production process is determined to have a higher priority than a process associated with the previously received film-processing order.

39. The resource manager of claim 30 wherein receiving the film-processing order includes receiving an IP packet with the film-processing requirement encapsulated in an attribute portion of the IP packet.

40. The resource manager of claim 39 wherein the requirement controller is structured and arranged to determining a state of processing for the motion picture film, determining a film processing operation to be performed on the motion picture film, and using the film-processing operation to generate the film-processing requirement.

41. The resource manager of claim 30 wherein the motion picture film includes a film-processing order.

42. The resource manager of claim 30 wherein the motion picture film includes one or more reels of a film.

43. The resource manager of claim 42 wherein the first communications interface is structured and arranged to receive a film reel from a robotic array of two or more film reels enabling the film reel to be accessed.

44. The resource manager of claim 30 wherein the film-processing order comprises a date requirement indicating a date and time by which the motion picture film-processing order is required to be performed.

45. The resource manager of claim 30 wherein the scheduling controller is structured and arranged to use the date requirement to schedule the motion picture film-processing order.

46. The resource manager of claim 30 wherein the motion picture film-processing order comprises a time requirement indicating the total amount of time to be spent on a film-processing order.

47. The resource manager of claim 46 wherein the scheduling controller is structured and arranged to use the time requirement to schedule the motion picture film-processing order.

48. The resource manager of claim 30 wherein the motion picture film-processing order is received separately from the film.

49. The resource manager of claim 30 wherein the first or second resources includes an array of two or more film scanners.

50. The resource manager of claim 30 further comprising a display controller structured and arranged to transmit a schedule to an operator indicating an assignment of the motion picture film-processing order to the first or second resources.

51. The resource manager of claim 50 wherein the display controller polls the operator to determine if the schedule is acceptable to the operator.

52. The resource manager of claim 50 wherein the display controller presents display of one or more alternative processing schedules to the operator.

53. The resource manager of claim 50 wherein the display controller enables the operator to adjust the processing schedule to the operator.

54. The resource manager of claim 30 further comprising a first capacity planning controller structured and arranged to identify underutilized resources.

55. The resource manager of claim 54 further comprising a second capacity planning controller structured and arranged to identify one or more future resources to be added to increase a throughput of a film-processing system.

56. A film resource manager configured to process motion picture films, the resource manager comprising:
means for receiving a motion picture film-processing order to process a motion picture film;
means for determining a first interruptible post-production process on the motion picture film useful in fulfilling the motion picture film-processing order;
means for identifying first resources available to perform the first interruptible post-production process useful in fulfilling the motion-picture film-processing order;
means for scheduling the first interruptible post-production process with the identified first resources;
means for sending the motion picture film to the first resources available to perform the first interruptible post-production process;
means for receiving a processed motion picture film from the first resources;
means for determining a second interruptible post-production process on the processed motion picture film useful in fulfilling the motion picture film-processing order, wherein the second interruptible post-production process is different from the first interruptible post-production process;
means for identifying second resources available to perform the second interruptible post-production process;
means for scheduling the second interruptible post-production process with the second resources; and
means for sending the processed motion picture to the second resources to perform the second interruptible post-production process.

57. A resource manager program embodied in a computer readable storage medium configured to process motion picture films, the resource manager comprising:
a first communications processing component structured and arranged to receive a motion-picture film-processing order to process a digitized motion picture film;
a requirement processing component structured and arranged to determine a first interruptible post-production process on the digitized motion picture film useful in fulfilling the motion picture film-processing order
an identification processing component structured and arranged to identify one or more resources available to perform the first interruptible post-production process;
a scheduling processing component structured and arranged to schedule the first interruptible post-production process with at least one of the identified resources; and
a second processing component structured and arranged to:
receive a processed motion picture film from the first resources;
determine a second interruptible post-production process on the processed motion picture film useful in fulfilling the motion picture film-processing order, wherein the second interruptible post-production process is different from the first interruptible post-production process;
identify second resources available to perform the second interruptible post-production process;
schedule the second interruptible post-production process with the second resources; and
send the processed motion picture to the second resources to perform the second interruptible post-production process.

58. The resource manage program of claim 57 wherein the first communications processing component, the requirement processing component, the identification processing component, the sending interface component, the receiving interface component, the second processing component, and the scheduling processing component are all implemented by a single processor.

* * * * *